(12) United States Patent
Holden

(10) Patent No.: US 9,271,052 B2
(45) Date of Patent: Feb. 23, 2016

(54) GRID ENCODED MEDIA ASSET DATA

(75) Inventor: Dan Holden, Englewood, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 302 days.

(21) Appl. No.: 13/103,185

(22) Filed: May 9, 2011

(65) Prior Publication Data

US 2011/0274179 A1 Nov. 10, 2011

Related U.S. Application Data

(60) Provisional application No. 61/333,053, filed on May 10, 2010.

(51) Int. Cl.

| | |
|---|---|
| H04N 7/12 | (2006.01) |
| H04N 7/10 | (2006.01) |
| H04N 21/6377 | (2011.01) |
| H04N 21/231 | (2011.01) |
| H04N 21/233 | (2011.01) |
| H04N 21/2343 | (2011.01) |
| H04N 21/2389 | (2011.01) |
| H04N 21/258 | (2011.01) |
| H04N 21/4385 | (2011.01) |
| H04N 21/6405 | (2011.01) |
| H04N 21/658 | (2011.01) |
| H04N 21/6587 | (2011.01) |
| H04N 21/845 | (2011.01) |

(52) U.S. Cl.
CPC ....... *H04N 21/6377* (2013.01); *H04N 21/2335* (2013.01); *H04N 21/2343* (2013.01); *H04N 21/2389* (2013.01); *H04N 21/23109* (2013.01); *H04N 21/25808* (2013.01); *H04N 21/4385* (2013.01); *H04N 21/6405* (2013.01); *H04N 21/658* (2013.01); *H04N 21/6582* (2013.01); *H04N 21/6587* (2013.01); *H04N 21/8456* (2013.01)

(58) Field of Classification Search
CPC .................... H04L 12/189; H04N 21/234327; H04N 21/2662
USPC ..................................... 375/240; 725/112, 12
See application file for complete search history.

(56) References Cited

U.S. PATENT DOCUMENTS

| | | | |
|---|---|---|---|
| 5,594,492 A | 1/1997 | O'Callaghan et al. | |
| 7,418,007 B1 * | 8/2008 | Liu et al. | 370/468 |
| 7,590,991 B2 | 9/2009 | Arad et al. | |
| 8,166,503 B1 * | 4/2012 | Rosenberg et al. | 725/39 |

(Continued)

FOREIGN PATENT DOCUMENTS

| | | |
|---|---|---|
| EP | 1936989 | 6/2008 |
| WO | 2004027638 | 4/2004 |

OTHER PUBLICATIONS

European Search Report and Opinion for EP11165583 mailed Sep. 23, 2011.

(Continued)

*Primary Examiner* — Dave Czekaj
*Assistant Examiner* — Tsion B. Owens
(74) *Attorney, Agent, or Firm* — Banner & Witcoff, Ltd.

(57) ABSTRACT

Metadata can identify temporal segments of content associated with a media asset and can identify asset data types. In response to a request for a particular asset, a central office may identify a data type and a temporal segment based on metadata associated with the request.

20 Claims, 10 Drawing Sheets

(56) References Cited

U.S. PATENT DOCUMENTS

| | | | |
|---|---|---|---|
| 2003/0033606 A1* | 2/2003 | Puente et al. | 725/110 |
| 2003/0093810 A1* | 5/2003 | Taniguchi | 725/112 |
| 2006/0190974 A1 | 8/2006 | Lee | |
| 2006/0221178 A1* | 10/2006 | Yun et al. | 348/42 |
| 2007/0162487 A1 | 7/2007 | Frailey | |
| 2007/0198563 A1* | 8/2007 | Apparao et al. | 707/101 |
| 2007/0204290 A1* | 8/2007 | Li | 725/31 |
| 2007/0204314 A1* | 8/2007 | Hasek et al. | 725/100 |
| 2009/0105879 A1* | 4/2009 | Ng-Thow-Hing et al. | 700/245 |
| 2010/0002696 A1 | 1/2010 | Vare et al. | |
| 2011/0107364 A1* | 5/2011 | Lajoie et al. | 725/25 |
| 2011/0164111 A1* | 7/2011 | Karaoguz et al. | 348/43 |
| 2011/0164115 A1* | 7/2011 | Bennett et al. | 348/46 |

OTHER PUBLICATIONS

"TDV CODEC—Enabling 30 HD video for massive adoption providing 20 compatibility", Aug. 1, 2008, XP55038412, Retrieved from the Internet: URL:http://www.tdvision.com/WhitePapers/TOVision_TDVCodec_Whitepaper_Rev 2_3.pdf [retrieved on Sep. 17, 2012].

EP Examination report—EP11165583.3, mailing date: Sep. 24, 2012.

\* cited by examiner

106 →

| | Asset A | Fragment (0) | Fragment (1) | ••• | Fragment (N) | ••• |
|---|---|---|---|---|---|---|
| 151 | MPEG-2 (720p60) | 151-0 | 151-1 | ••• | 151-N | ••• |
| 152 | MPEG-2 (1080p24) | 152-0 | 152-1 | ••• | 152-N | ••• |
| 153 | MPEG-2 (1080p30) | 153-0 | 153-1 | ••• | 153-N | ••• |
| 154 | MPEG-4 (1080p60) | 154-0 | 154-1 | ••• | 154-N | ••• |
| 155 | MPEG-2 (480i) | 155-0 | 155-1 | ••• | 155-N | ••• |
| 156 | MPEG-2 (1080i)(left) | 156-0 | 156-1 | ••• | 156-N | ••• |
| 157 | MPEG-2 (1080i)(right) | 157-0 | 157-1 | ••• | 157-N | ••• |
| 158 | AC3 | 158-0 | 158-1 | ••• | 158-N | ••• |
| 159 | AAC | 159-0 | 159-1 | ••• | 159-N | ••• |
| 160 | FLASH | 160-0 | 160-1 | ••• | 160-N | ••• |
| 161 | WM9 | 161-0 | 161-1 | ••• | 161-N | ••• |
| 162 | EBIF | 162-0 | 162-1 | ••• | 162-N | ••• |
| 163 | TRU2WAY | 163-0 | 163-1 | ••• | 163-N | ••• |
| 164 | PACKETCABLE | 164-0 | 164-1 | ••• | 164-N | ••• |

FIG. 4

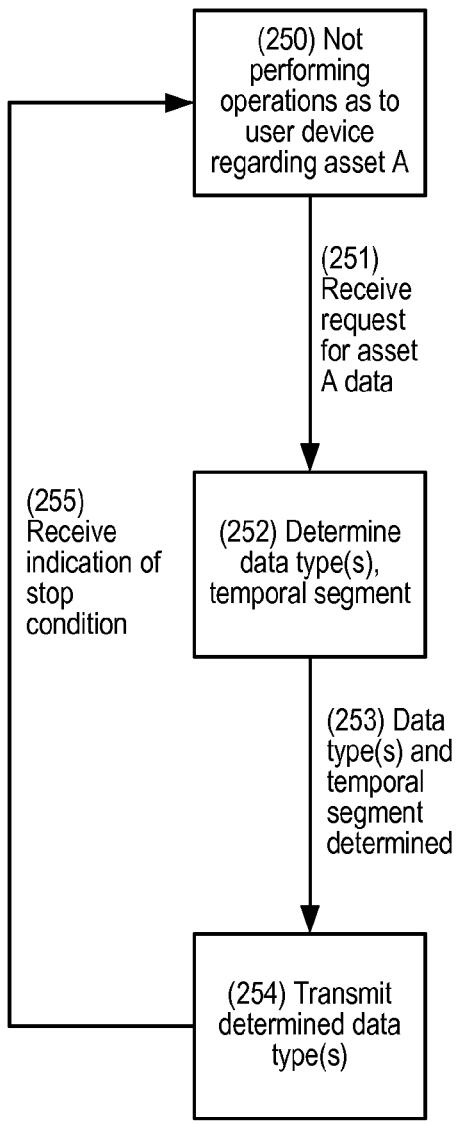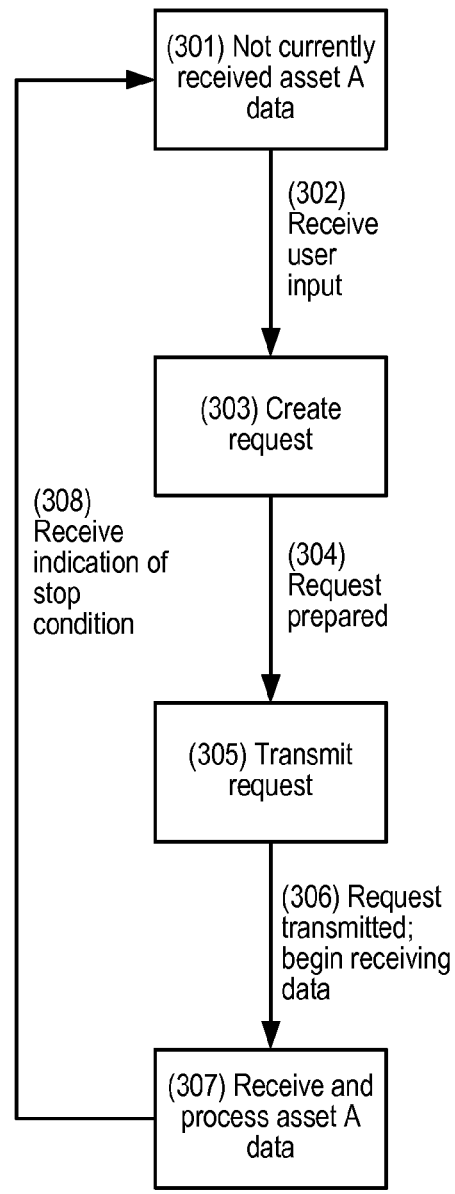
FIG. 6
FIG. 7

GRID ENCODED MEDIA ASSET DATA

CROSS-REFERENCE TO RELATED APPLICATIONS

This application claims priority to Provisional U.S. Patent Application Ser. No. 61/333,053, filed May 10, 2010, and titled "Grid Encoded Media Asset Data," which application in its entirety is incorporated by reference herein.

BACKGROUND

Communications networks can be used to deliver data that includes video, audio and other types of information. Video content, audio content and other information types can be encoded in a variety of different ways. In many cases, data encoded using a particular coding technique will require a specific type of software and/or hardware to decode that data and to recover the encoded information. For example, a movie, television program or other audiovisual work may have associated video content (e.g., a series of image frames) and associated audio content (e.g., the soundtrack). The video content might be encoded into a first set of data using a first video CODEC (COder DECoder) and into a second set of data using a second video CODEC. In order to render the video content from the first set of data, a device receiving the first data set would need to process that data using the first video CODEC. Rendering the video content from the second set of data would similarly require the second CODEC. An analogous situation can exist with regard to encoding the audio content using different audio CODECs.

If a network has numerous end devices using different combinations of video CODECs and audio CODECs, it is desirable to transmit (or at least make available) data compatible with each type of CODEC. Conventionally, this has been achieved through "blob" encoding a separate data stream for each possible combination of consumable data. As a simple example, a network may serve some end devices using video CODEC 1 and audio CODEC 1, may serve other devices using video CODEC 1 and audio CODEC 2, still other devices using video CODEC 2 and audio CODEC 1, and yet other devices using video CODEC 2 and audio CODEC 2. Under conventional practice, the network might create and store four different data blobs for a particular audiovisual work. The first blob would include data encoding the video content with video CODEC 1 and audio content with audio CODEC 1, the second blob would include data encoding the video content with video CODEC 1 and audio content with audio CODEC 2, etc. As the number of different data encodings or other data types increases, this approach can become quite unwieldy. For example, an audiovisual work having 8 possible types of video encodings, 2 possible types of audio encodings, and 3 possible types of enhancement layer data could require as many as 286 data blobs to provide all possible combinations of a video encoding, an audio encoding and an enhancement layer data type.

SUMMARY

This Summary is provided to introduce a selection of concepts in a simplified form that are further described below in the Detailed Description. This Summary is not intended to identify key features or essential features of the invention.

In some embodiments, a memory (e.g., in a media central office) stores data for each of multiple media assets. For each asset, that data can include temporal metadata identifying temporal segments of a video content associated with the asset. The data for each asset can also include video metadata identifying types of video data, with each video data type encoding a different representation of the asset video content. The data for each asset can further include multiple video data sets, with each video data set being divided into a group of fragments, and with each fragment including data encoding one of the different representations of a portion of the asset video content. For each of the video data sets, data maps each of the fragments of the group to one of the temporal segments and to one of the video data types. In response to a request for a particular asset, the central office (e.g., a head end, a content provider server, etc.) may identify a video data type and a temporal segment based on video metadata and temporal metadata associated with the request. The central office may then transmit requested asset video data of the identified type and including fragments mapped to the identified temporal segment and to succeeding temporal segments. Similar operations can be performed with regard to multiple sets of audio data for an asset and with regard to other types of asset data.

BRIEF DESCRIPTION OF THE DRAWINGS

FIG. 4 shows a metadata table according to some embodiments.

FIG. 6 is a block diagram showing various states of a media central office according to some embodiments.

FIG. 7 is a block diagram showing various states of a user device according to some embodiments.

DETAILED DESCRIPTION

In some embodiments, grid encoding is used to fragment video, audio and other types of data for a media asset and to schematically organize the data as a grid. In at least some such embodiments, the grid may be represented as a table in which one axis of the table corresponds to time segments of the media asset and another axis of the table corresponds to different data types. The grid scheme can be used to access the types of data usable by a particular device and avoid the need for blob encoding of multiple combinations of data types for a single asset. Additional details of grid encoding according to some embodiments are provided below.

Figure 1:
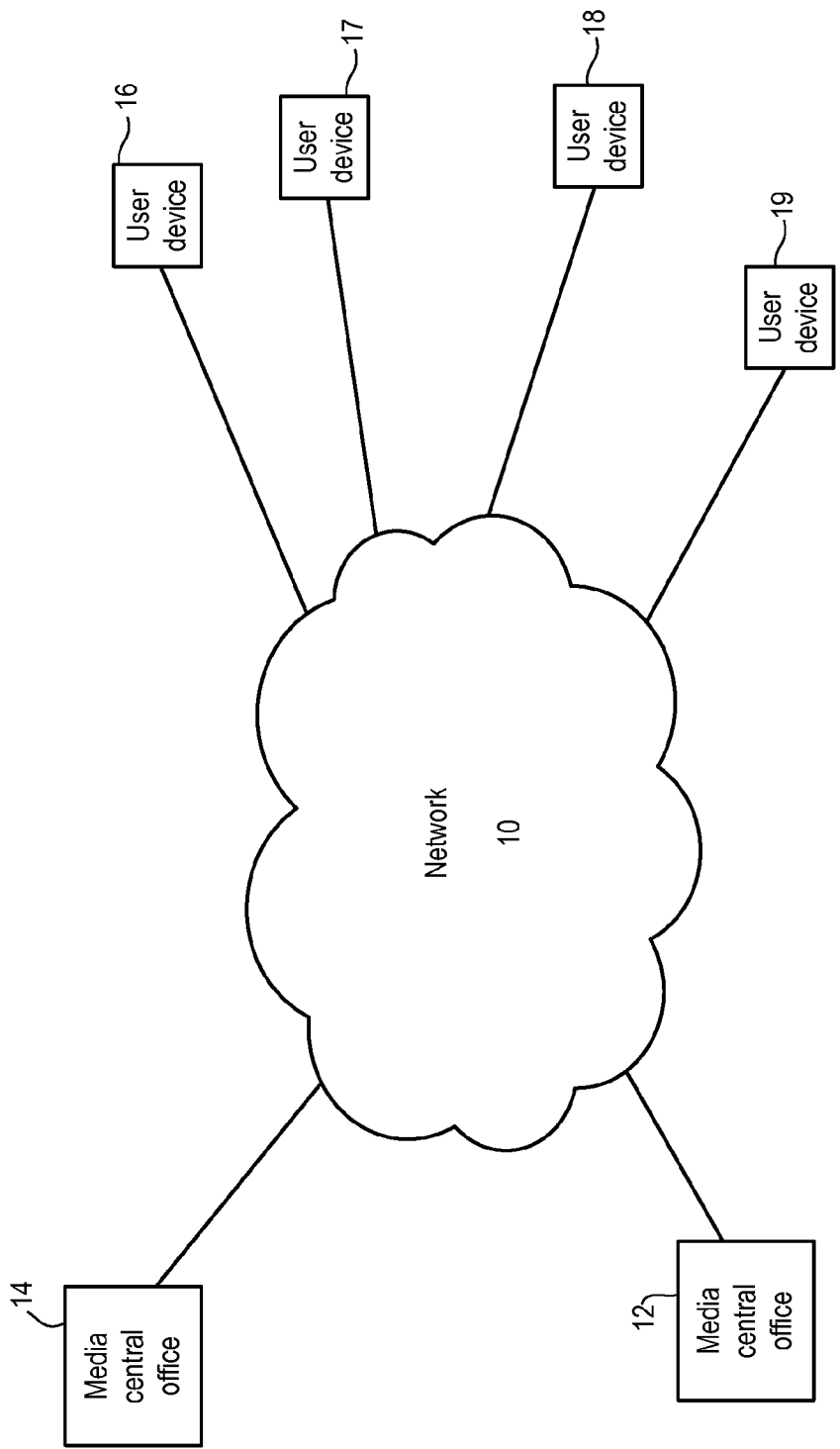
FIG. 1 is a block diagram showing elements in a network according to some embodiments.

FIG. 1 is a block diagram showing elements in a network according to some embodiments. In the example network of FIG. 1, media central offices 12 and 14 communicate with multiple user devices (UD) over a network 10. As described in more detail below, media central office 12 outputs media asset data to user devices on a unicast basis. Media assets and the types of data they include are further discussed below. Media central office 12 could be, for example, part of a video on demand (VOD) system. As is also described in more detail below, media central office 14 outputs media asset data to user devices on a linear and/or multicast basis. User devices 16-19 receive media asset data from central offices 12 and 14 and process that data for use in presenting video, audio and other forms of information to users. User devices 16-19 may also transmit communications to central offices 12 and 14 and/or other elements in network 10.

Various embodiments described herein can be implemented in any of numerous types of communication networks. Accordingly, network 10 is shown generally in FIG. 1 as a cloud. In some embodiments, network 10 may include an IP (internet protocol) backbone that links central offices 12 and 14 with access sub-networks that serve user devices, and that also links central offices 12 and 14 with various other elements in network 10. Access sub-networks that serve user devices could be of various architectures and employ various communication protocols. In some embodiments, some or all user devices may be served by hybrid fiber coaxial (HFC) access sub-networks. In still other embodiments, user devices may be served by a Fiber To The Home (FTTH) passive optical network (PON) access sub-network. In yet other embodiments, user devices may be served by a digital subscriber line (DSL) access sub-network or by a wireless access sub-network (e.g., a cellular telephone network, a satellite network, a WiMAX network). Some embodiments may include multiple types of access sub-networks. For convenience, FIG. 1 only shows two central offices and four user devices. However, network 10 could include numerous additional user devices and numerous additional media central offices similar to those described herein.

Media asset data output by each of central offices 12 and 14 includes data that encodes representations of content. Content may include images and/or sounds that are associated with a particular audiovisual work. As one example, a particular audiovisual work may be a television program. The video content of that television program could include a sequential series of image frames that form the video portion of the program. The audio content of the television program could include the soundtrack that forms the audio portion of the program. Other examples of audiovisual works that have video and audio content include, without limitation, movies, sports events, concerts, etc.

Content for a particular work can be encoded into content data that is transmitted over network 10 to user devices. A user device receives such data and decodes it. The decoded data is then used to reproduce the content for presentation to a user through a video display device and/or through an audio output device. Numerous different techniques can be used to encode content into content data. In many cases content is encoded and decoded using a CODEC (coder/decoder) that is specific to a particular encoding method (or class of coding methods). A CODEC may be implemented as software executing on a general purpose processor, as an application-specific integrated circuit (ASIC), or in some other manner. Various CODECs can produce multiple different representations of the same content. For example, some video CODECs compress a content data stream by eliminating and/or approximating certain picture elements that most users would not notice. Similarly, various audio CODECs reduce the size of a data stream by omitting certain frequency components that many users do not hear or do not notice. Thus, for example, the video content of a particular audiovisual work may be encoded into one representation that provides a higher picture quality (e.g., larger number of pixels and faster refresh rate) but that includes a relatively large amount of data. That same work may be encoded into other representations that have reduced picture quality (e.g., fewer pixels and/or slower refresh rate) but that can be encoded using less data. The audio content of a particular work may also be encoded into multiple representations that have differing trade-offs between audio quality and data quantity.

As another example of multiple representations, video content of an audiovisual work can be encoded into representations used to create (or at least simulate) three-dimensional ("3D") display of that video content. In particular, data encoding a 3D representation of a work may include data that encodes two slightly different "left eye" and "right eye" representations of each image frame. Each 3D frame of the video content has a left eye frame and a right eye frame that is spatially offset from the left eye frame. When these two frames are simultaneously displayed on an appropriately configured display device, a user (who may be wearing polarized glasses or other special eyewear) can perceive the content as being presented in three dimensions.

In some cases, there may also be multiple versions of the video and/or audio content of a particular work. For example, one version of a work's audio content may be in English and a second version of the work's audio content may be in Spanish. Each video and/or audio version could in turn be encoded into multiple representations.

In some embodiments, data for multiple representations and/or versions of an audiovisual work are collectively treated as a single media asset. In at least some such embodiments, a media asset can include additional types of data. For example, interactive television (iTV) enhancement layer data may be associated with an asset. Such data could be used to facilitate interactive communication between an application executing on a user device and a central office, or between such an application and another network element, for any of numerous purposes. Another example of an additional type of data that might be associated with a media asset is text for closed captioning.

Figure 2:
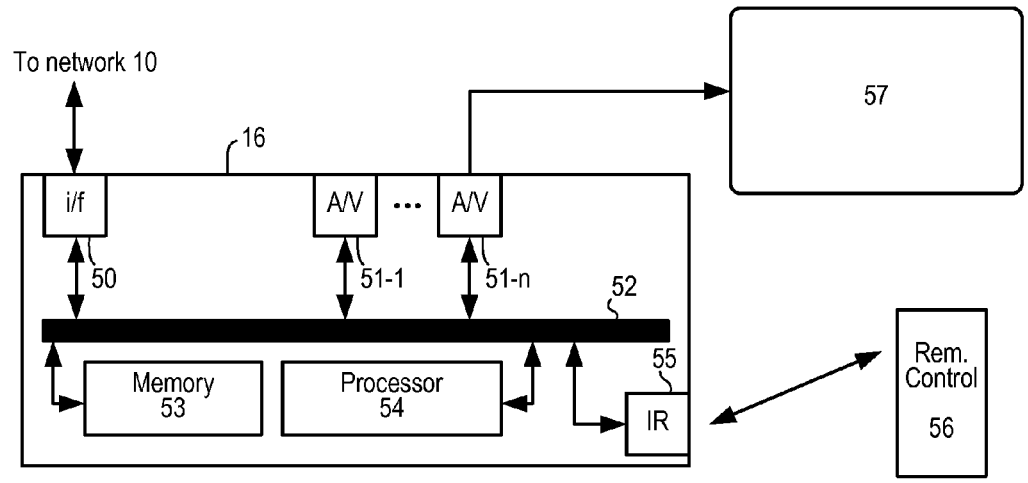
FIG. 2 is a block diagram showing an exemplary user device according to some embodiments.

FIG. 2 is a block diagram of an exemplary user device 16 and a video display device 57 (e.g., a television) connected to user device 16. User device 16 could be, e.g., a set top terminal (STT). As explained below, however, a user device could take numerous other forms.

User device 16 communicates with network 10 over an interface (i/f) 50 that provides a physical connection to the medium of an access sub-network that serves user device 16. In an HFC access network, interface 50 could include hardware for tuning to RF frequency channels, for demodulating signals received in those tuned channels, for outputting data from demodulated signals for further processing, for modulating data onto an upstream signal and for transmitting that upstream signal to network 10. In an FTTH PON access sub-network, interface 50 could include the components of an optical network terminal (ONT) that performs modulation, demodulation, transmission and receiving operations. In a wireless access sub-network, interface 50 may include a wireless transceiver that performs tuning, modulation, demodulation, transmission and receiving operations. In a DSL access sub-network, interface 50 may include a DSL modem that performs the modulation, demodulation, transmission and receiving operations. In still further embodiments, interface 50 may include an Ethernet, MoCA (Multimedia over Coax Alliance), WiFi or other local network interface that connects user device 16 to a separate cable modem, ONT, wireless transceiver, DSL modem or other access sub-network connection point.

User device 16 further includes memory 53 for storing instructions and data and a processor 54 for executing instructions and controlling operation of device 16. Although a single block is shown for memory 53 and a single block shown for processor 54, memory and computational operations of user device 16 could respectively be distributed across multiple memory devices and multiple processors located within user device 16. For example, device 16 may include additional processors for executing video and audio CODEC routines. Memory 53 may include volatile and non-volatile memory and can include any of various types of storage technology, including but not limited to read only memory (ROM) modules, random access memory (RAM) modules, magnetic tape, magnetic discs (e.g., a fixed hard disk drive or a removable floppy disk), optical disk (e.g., a CD-ROM disc, a CD-RW disc, a DVD disc), flash memory, and EEPROM memory. Processor 54 may be implemented with any of numerous types of devices, including but not limited to general purpose microprocessors, application specific integrated circuits, field programmable gate arrays, and combinations thereof. In at least some embodiments, processor 54 carries out operations of device 16 described herein according to machine readable instructions stored in memory 53 and/or stored as hardwired logic gates within processor 54. Processor 54 communicates with and controls memory 53 and interface 50 over one or more buses 52. Device 16 also includes one or more audio and/or video interfaces 51-1 through 51-*n* (e.g., left and right audio channel outputs, a video output, an HDMI output) over which electrical signals are output for presentation of video content on television 57 and presentation of audio content on one or more speakers (not shown). An infrared interface 55 receives input from remote control handset 56.

Memory 53 of user device 16 can be used to store instructions and data used by device 16 to carry out conventional operations such as decoding content data, providing an electronic program guide (EPG) user interface, etc. Memory 53 may also used to store content data for later playback (retrieval and decoding to view content encoded by such data). In addition to data used for various user device operations, memory 53 may also store data that identifies device 16 within network 10. Memory 53 may further store compatibility data that indicates the capabilities of user device 16, of television 57, and/or of other devices connected to device 16. Such compatibility data may include data specifying the audio and video CODEC(s) utilized by device 16, specifying whether television 57 can display 3D video representations, specifying the type of enhancement data accepted by device 16, specifying user preferences, etc.

As indicated above, a user device may take different forms in other embodiments. As but one example, a general purpose home computer could operate as a user device. As another example, a user device could take the form of a home media gateway having many of the components shown in FIG. 2. Although the example of FIG. 2 shows a separate display device in the form of television 57, a user device could include a video display and/or speakers as part of the user device.

Figure 3:
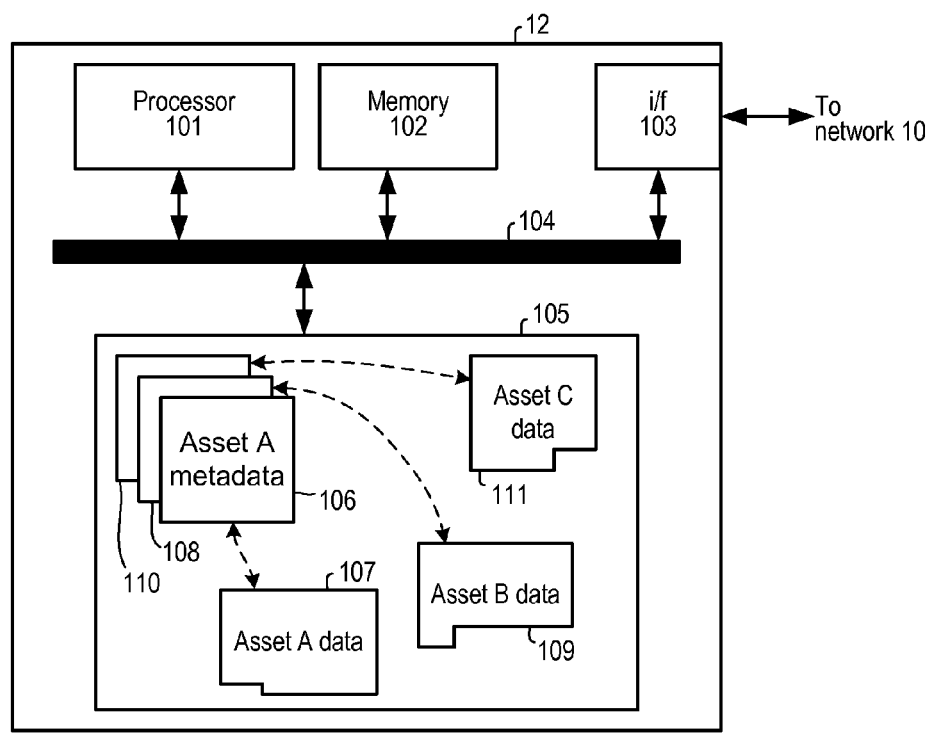
FIG. 3 is a block diagram of an exemplary media central office according to some embodiments.

FIG. 3 is a block diagram of media central office 12. For convenience, certain embodiments will be described by reference to an exemplary embodiment in which a media central office is a single device such as a server connected to a network. In other embodiments, various operations of media central office 12 described herein may be performed by multiple servers or other devices. Such devices could be in the same location or could be dispersed in different locations throughout network 10. Media central office 14 may include components similar to those described in connection with media central office 12, but which are instead configured to carry out various operations in connection with multicast communications such as are described below.

Media central office 12 includes a main database memory 105 that stores data for media assets A (block 107), B (block 109) and C (block 111). Memory 105 also stores metadata 106 related to data for media asset A, metadata 108 related to data for media asset B, and metadata 110 related to data for media asset C. Although asset data for each of assets A, B and C is shown as a single block for convenience, all data for a single asset need not be stored in contiguous memory regions. Similarly, all metadata related to a particular asset need not be stored in contiguous memory spaces. Memory 105 may also contain data and metadata for numerous other media assets. Additional details of asset data and asset metadata are provided below.

Central office 12 communicates with network 10 over one or more network interfaces 103. Interface 103 could be, e.g., a Gigabit Ethernet card. Central office 12 further includes a memory 102 that contains instructions and data and a processor 101 that controls operation of central office 12. In at least some embodiments, processor 101 carries out operations of central office 12 described herein according to machine readable instructions stored in memory 102 and/or stored as hardwired logic gates within processor 101. Processor 101 communicates with and controls memories 102 and 105 and interface 103 over one or more buses 104. Although each of memory 102, memory 105 and processor 101 is represented as a single block, memory and computational operations of central office 12 could be distributed across multiple memory devices and multiple processors located within central office 12. Memory 102 and memory 105 could also be combined into a single memory device. Memories 102 and 105 could be implemented using technologies that include, but are not limited to, those described in connection with memory 53 of user device 16. Processor 101 could be implemented using technologies that include, but are not limited to, those described in connection with processor 54 of user device 16.

FIG. 4 is a block diagram showing metadata table 106 associated with media asset A. Other metadata tables stored in memory (e.g., tables 108 and 110 of FIG. 3) may contain similar types of metadata as table 106 and may be organized in a manner similar to table 106, but be associated with other media assets. As can be appreciated by persons of ordinary skill in the art, a database table such table 106 is a construct used to organize and access data corresponding to individual table cells. The actual metadata corresponding to rows, columns and cells of table 106 (or to other tables stored in memory 105) need not be placed in physical memory locations that have the same relative positions as their corresponding rows, columns and cells.

Columns of table 106 are titled "Fragment( )" and contain cells holding information mapping different fragments of asset A data to various items of metadata. In particular, each cell holds a pointer, an address to a memory 105 storage location, or some other identifier for a fragment of some type of data set associated with asset A. Such data sets include sets of data encoding various representations of the asset A content, as well as other types of data described below. The fragment identified by a particular cell is mapped, based on the cell position in table 106, to the metadata associated with the cell's column and row. Each cell can also be mapped to (or include) other metadata.

Each column of table 106 corresponds to metadata that identifies a specific temporal segment of asset A. The parenthetical in each column of table 106 indicates the different temporal segment of asset A to which the column corresponds. For example, asset A may be a movie that has a total length (or runtime) of 1 hour and 45 minutes if played non-stop at the correct speed. The first column 180 might correspond to segment 0 and to a first portion of the movie runtime (e.g., to the first 5 seconds of the movie). The second column 181 corresponds to segment 1 and to the next portion of the movie runtime (e.g., to the next 2.5 seconds of the movie). Subsequent columns correspond to successive segments and portions of the movie. Temporal segments corresponding to columns of table 106 can be of arbitrary duration; different temporal segments for a particular asset can have different durations. The number of columns in a metadata table will depend on the length of the asset to which the table is related and the manner in which the asset data is fragmented.

Each row of table 106 corresponds to metadata identifying a specific type of data set for asset A. Row 151 corresponds to metadata identifying a set of data that encode the entire video content of asset A, using an MPEG-2 CODEC, into a representation having a video quality of 720p60 (720 lines of horizontal resolution, progressive scan, 60 frames per second). Row 152 corresponds to metadata identifying a set of data encoding the asset A video content with an MPEG-2 CODEC into a 1080p24 representation. Row 153 corresponds to metadata identifying a set of data encoding the asset A video content with an MPEG-2 CODEC into a 1080p30 representation. Row 154 corresponds to metadata identifying a set of data encoding the asset A video content with an MPEG-4 (H.264) CODEC into a 1080p60 representation. Row 155 corresponds to metadata identifying a set of data encoding the asset A video content with an MPEG-2 CODEC into a 480i representation (480 lines of horizontal resolution, interlaced scan, 60 fields (30 frames) per second).

Rows 156 and 157 correspond to metadata identifying sets of asset A data encoding a 3D representation of the asset A video content. Specifically, row 156 corresponds to metadata identifying a "left eye" set of data that encodes the asset A video content with an MPEG-2 CODEC into a 1080i representation. Row 157 corresponds to metadata identifying a "right eye" set of data that encodes the asset A video content with an MPEG-2 CODEC into a 1080i representation, with the right eye representation being spatially offset from the left eye representation. In some embodiments, and as discussed below in connection with FIGS. 11A and 11B, the right eye data set may encode a difference between left eye and right eye video frames and may utilize the video data for the left eye frame to recreate the right frame.

Rows 158 and 159 correspond to metadata identifying sets of data encoding different representations of the asset A audio content. Row 158, for example, corresponds to metadata identifying a set of data that encode the entire audio content of asset A with an AC3 audio CODEC into a representation having a particular audio quality. Row 159 corresponds to metadata identifying a set of data encoding the asset A soundtrack with an AAC (advanced audio coding) CODEC into another representation having a different audio quality.

In some cases, a row may correspond to metadata that identifies a data set containing data encoding a video representation and also containing data encoding an audio representation. For example, row 160 corresponds to metadata identifying a set of data that includes ADOBE FLASH data containers that have encoded audio and encoded video. Row 161 corresponds to metadata identifying a set of MICROSOFT WINDOWS MEDIA 9 data containers that include encoded audio and encoded video.

Rows 162-164 of table 106 correspond to metadata identifying sets of different types of enhancement layer data for asset A. Row 162 corresponds to metadata that identifies a set of enhancement layer data formatted according to the Enhanced Binary Interchange Format (EBIF). Row 163 corresponds to metadata that identifies a set of enhancement layer data that can be utilized by user devices able to execute TRU2WAY (formerly known as OPENCABLE and/or OCAP) applications. Row 164 corresponds to metadata that identifies a set of enhancement layer data that can be utilized by user devices able to execute PACKETCABLE applications.

Rows 151-164 merely represent some examples of the types of asset data that can be identified by metadata in an asset metadata table. Additional non-exclusive examples include data for presentation of an asset using the "Smooth Streaming" media streaming extension to Internet Information Services (IIS) for Windows® Server (available from Microsoft Corporation). All assets need not have the same types of asset data, and thus metadata tables for different assets can differ significantly. For example, some assets may include fewer (or more) representations of video content, fewer (or more) representations of audio content, etc. As another example, an asset may have an audio and/or video representation based on CODECs not used in connection with other assets. As yet another example, an asset may have a video (or audio) content representation encoded with a particular CODEC and having a particular quality, but one or more other assets may only include representations encoded with that same CODEC and having a different quality.

Figure 5:
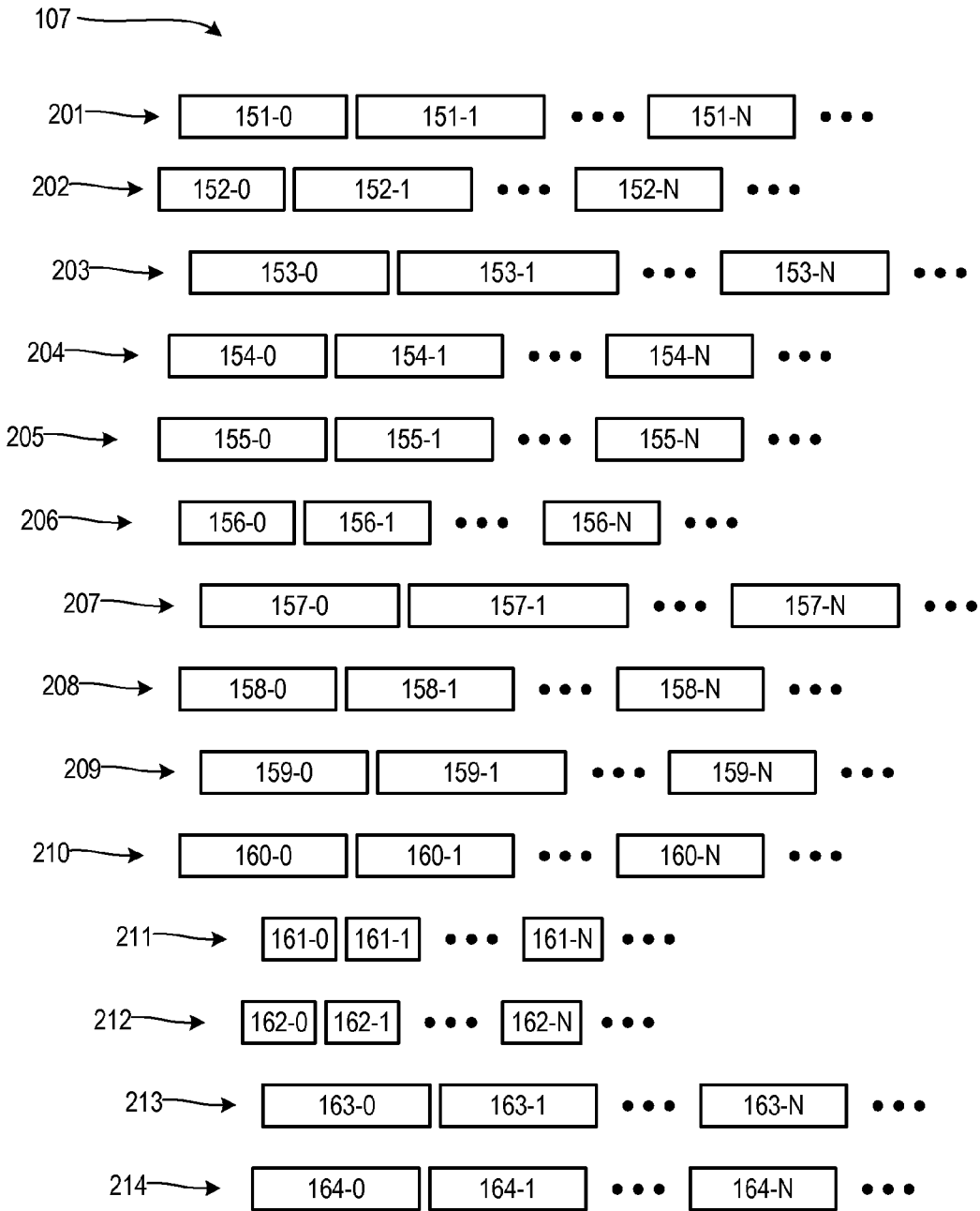
FIG. 5 is a block diagram schematically showing data sets for a media asset according to some embodiments.

As can be appreciated from the above description of the rows and columns of table 106, each cell of table 106 represents a fragment of a particular type of data for a particular temporal segment of asset A. The data type and temporal segment applicable to each fragment are identified by the metadata mapped to that fragment in table 106. Such metadata is mapped to a given fragment in table 106 based on the location of the fragment identifier in a particular cell of table 106. This can be further illustrated using FIG. 5, a block diagram schematically showing each set of asset A data. Each data fragment in FIG. 5 is identified by the same reference number used to identify that fragment in a cell of table 106 in FIG. 4. For example, set 201 in FIG. 5 contains data encoding an MPEG-2 720p60 representation of the asset A video content. Thus, identifiers for fragments in set 201 can be found using the metadata associated with table 106 row 151 and using the metadata associated with a table 106 column. Each of the cells in row 151 contains information identifying a fragment of the set 201 data for a particular temporal segment. Fragment 151-0 is identified by the entry in the cell of table 106 in row 151 under column 180 ("Fragment(0)"). Fragment 151-0 contains data encoding an MPEG-2 720p60 representation of the asset A video content during segment 0. Fragment 151-1 contains data encoding an MPEG-2 720p60 representation of the asset A video content during segment 1, and is identified by an entry in the cell of table 106 in row 151, column 181 ("Fragment(1)"). This continues for all temporal segments of asset A, with fragment 151-N containing data encoding an MPEG-2 720p60 representation of the asset A video content during segment N and identified by an entry in the cell of table 106 in row 151, column 182 ("Fragment (N)"). The presence of additional fragments in set 201 and in other sets is represented by ellipses.

A similar pattern follows for data sets 202-214, with each fragment in those sets (FIG. 5) sharing a reference number with the table 106 cell (FIG. 4) representing that fragment. Each fragment in sets 206-207 contains encoded video content data of the type and for the temporal segment identified by the metadata mapped to the fragment in table 106 of FIG. 4. Each fragment in sets 208 and 209 contains encoded audio content data of the type and for the temporal segment identified by the metadata mapped to the fragment in table 106. Each fragment in sets 210 and 211 contains encoded video content data and encoded audio content data in one or more data containers of the type identified by the row metadata mapped to the fragment in table 106, and for the temporal segment of asset A identified by the column metadata mapped to the fragment in table 106. Each fragment in sets 212-214 contains enhancement layer data of the type and for the temporal segment identified by the metadata mapped to the fragment in table 106.

The arrangement of fragments in FIG. 5 is only for purposes of convenience in connection with the description herein. Memory spaces used to store asset data fragments need not have the spatial relationships suggested by FIG. 5. Each of the fragments shown in FIG. 5 may also have some or all of its mapped metadata included as part of the fragment. As one example, each fragment might contain data identifying the temporal segment for which the fragment contains asset A data. In this manner, such fragments received by a user device can be buffered and re-ordered if necessary (e.g., if fragments are not transmitted in temporal order). Inclusion of temporal segment metadata within each fragment may also permit synchronization of fragments for different combinations of individual data types.

In at least some embodiments, asset data is fragmentized at points that allow a user device to decode each fragment and utilize the decoded data to reproduce content without reliance on the data from a preceding or succeeding fragment. For example, MPEG-encoded video content data can be fragmentized along GOP (group of pictures) boundaries.

In some embodiments, a user device may utilize fragments from more than one set of asset data to render a particular representation of audio or video content. One example is the aforementioned data encoding a 3D representation of video content. In order to render a 3D representation of the asset A video content in the example of FIGS. 4 and 5, a user device would receive and decode data from set 206 (identified by metadata corresponding to row 156) and from set 207 (identified by metadata corresponding to row 157). Another example is data encoded using scalable CODECs. Some video CODECs can be configured to output a first set of data that is decodable to create a video content representation having a lower level of video quality. Those CODECs can further be configured to output additional data sets that can be combined with the first data set and then decoded so as to create video content representations having higher levels of video quality. In some such embodiments, a first set of data could contain data encoding the lower level of quality and be identified by metadata corresponding to a first row of an asset metadata table. A second set of data could contain encoded data usable with the data in the first set to create a second representation having a higher level of quality, with the second set of data identified by metadata corresponding to a second row of the asset metadata table. Additional scaled data sets could be included for combination with the first and second sets so as to obtain even higher quality representations. Similar techniques could be used with scalable audio CODECs.

Media central office 12 uses metadata table 106 to provide asset data to a requesting user device based on individual capabilities of that device, based on preferences of a user of that device, and/or based on permissions derived from business rules or other pre-established policies of network 10. For example, a first user device may only support standard definition video (480i) and AC3 encoded audio. In response to a request from (or on behalf of) the first user device for unicast delivery of asset A, central office 12 would output data set 205 as a stream of video content data and data set 208 as a stream of audio content data for transmission to the first user device. As another example, a second user device might support 3D display of video content and AAC-encoded audio. That second user device might also execute TRU2WAY applications during playback of an asset so as to provide interactive features (e.g., allowing a user to display text about a particular actor during a scene in which that actor is present). In response to a request from (or on behalf of) the second user device for unicast delivery of asset A, central office 12 would output data sets 206 and 207 as streams of video content data, data set 209 as a stream of audio content data, and data set 213 as a stream of enhancement layer data for transmission to the second user device.

FIG. 6 is a block diagram showing various states of media central office 12, in some embodiments, in connection with transmission of asset A data to user device 16. At any one time, central office 12 might be simultaneously performing operations similar to those described in FIG. 6 (e.g., in concurrent processing threads) with regard to other assets and other user devices. In the state of block 250, central office 12 is not currently performing any operations with regard to user device 16 and asset A. Central office 12 may currently be providing asset A data to one or more other user devices, and/or may be providing data for some other asset to user device 16.

In response to a request from (or on behalf of) user device 16 for asset A data, and as shown by path 251, central office 12 transitions to state 252. The received request may be a request created by user device 16 and forwarded to central office 12 through network 10, or may be a request that was created by some intermediate network device based on a previous request from user device 16. The request may also be an initial request, e.g., user device 16 may not have been previously receiving asset A data and a user of device 16 may want to start watching the asset A content from the beginning (e.g., starting at temporal segment 0). Alternatively, the request may be a request to resume transmission of asset A data from some intermediate point where a user had previously stopped watching the asset A content. The received request includes information utilized by central office 12 to determine what fragments to transmit to user device 16. In particular, the request includes information that central office 12 utilizes to determine the types of asset A data to transmit and the temporal segment from which data streams of fragments in those data types should commence. In some embodiments, the request information includes metadata that specifies the type of video data, the type of audio data, and/or the other types of data to transmit, as well as the temporal segment from which transmission should begin. Such metadata could be added to the request by user device 16 or by some other network element storing data regarding capabilities of device 16 and/or storing data regarding services device 16 is permitted to receive according to network policies. In other embodiments, central office 12 may maintain a separate database that identifies capabilities, preferences and/or permissions associated with each user device and determine metadata for the appropriate data types for device 16 based on one or more entries in such a separate database. Such a separate database could also include an entry indicating whether a previous transmission of asset A data to device 16 was interrupted and, if so, the temporal segment of asset A where the interruption occurred.

Based on metadata contained in (and/or derived from) the received request, central office 12 determines which types of asset A data are to be transmitted to user device 16. Central office 12 also determines the temporal segment of A from which central office 12 should start sending fragments of the determined data types. In particular, central office 12 utilizes metadata identifying data types to determine the rows of table 106 corresponding to the requested data types. Central office 12 uses metadata identifying a temporal segment of asset A to determine the temporal segment from which transmission of asset A data should commence. In response to these determinations, and as shown by path 253, central office 12 transitions to state 254. In state 254, central office 12 begins transmitting asset A data of the types determined in block 12 and starting from the temporal segment determined in state 252. In some embodiments, central office 12 extracts the needed fragments from memory 105 using one or more queries based on metadata corresponding to the rows corresponding the requested data types and the column corresponding to the appropriate temporal segment from which transmission should begin. Such queries can, e.g., utilize Structured Query Language (SQL) requests modified to accommodate accessing of a video asset database.

Central office 12 remains in state 254 until a stop condition is reached. The stop condition could be transmission by central office 12 of fragments for the last temporal segment of asset A. The stop condition might also be receipt of a command from user device 16 to stop transmission. As a result of the stop condition, and as shown by path 255, central office 12 transitions to state 250.

FIG. 7 is a block diagram showing various states of user device 16, according to some embodiments, in connection with receipt of asset A data from central office 12. In state 301, device 16 is not currently receiving asset A data. In response to a user input (e.g., a selection of asset A by a user with remote control 56 shown in FIG. 2), and as shown by path 302, device 16 transitions to state 303. In state 303, device 16 creates a request that includes information identifying what types of asset data are desired. In some embodiments, memory 53 of device 16 stores information that indicates the types of CODECs supported by device 16 and/or regarding other device 16 capabilities. As part of preparing the request, device 16 includes information regarding supported CODECs or other device 16 capabilities. Memory 53 may also store information regarding user preferences and/or regarding capabilities of television 57 or other attached devices. For example, device 16 may have multiple video and audio CODECs and be able to output signals to generate video and/or audio representations of multiple qualities, but television 57 may not be able to provide certain video or audio quality levels.

In state 303, device 16 may also include information specifying the temporal segment of asset A from which data fragments should begin. For example, memory 53 may store data indicating that asset A has not previously been requested by device 16. In such a case, device 16 may include information in the request indicating that data should commence from temporal segment 0. As another example, a user may have previously begun watching asset A and then stopped. At the time of such stopping, device 16 may have stored data in memory 53 indicating the temporal segment at which the user stopped watching asset A. Device 16 could then include information in the request indicating that data should commence from that temporal segment where playback was previously halted.

After preparing the request in state 303, device 16 transitions to state 305 on path 304. In state 305, device 16 forwards the request prepared in state 303 to central office 12 or to another network element. When device 16 begins receiving asset A data in response to the request, and as shown by path 306, device 16 transitions to state 307. While in state 307, device 16 receives asset A data, decodes it, and outputs signals based on the decoded data to television 57 (or to another device) so as to render a representation of the asset A content. Device 16 remains in state 307 until receipt of data for the last temporal segment of asset A or until receipt of a user input indicating that playback of asset A content should cease. In response to such an input or to the receipt of data for the last temporal segment of asset A, device 16 transitions to state 301 on path 308.

In some embodiments, tables similar to table 106 are used in connection with multicast transmission of asset data in a network. All (or many) user devices in network 10 may be "receiving" a multicast transmission in the sense that signals carrying multicast data streams are reaching multiple user devices. At any one time, however, only a portion of those user devices may be recovering and processing data from those received streams so as to render content of a particular asset. Other user devices could simply ignore those data streams. The media central office or other network element transmitting the multicast asset data streams may have no knowledge of which user devices are currently utilizing which data streams for a particular asset and which devices might be ignoring data streams for a particular asset.

For example, media central office 14 and/or other elements of network 10 may be transmitting data for asset A on a multicast basis. Because central office 14 may not know which user devices are currently utilizing asset A data, central office 14 may not know the capabilities, preferences and/or permissions associated with such user devices. Accordingly, central office 14 may transmit each of the asset A data sets (FIG. 5) as a separate multicast stream. The transmissions of those streams are generally aligned along fragment boundaries so that, at any particular time during the multicast transmission, user devices can potentially choose from among any of several streams carrying video data for a specific temporal segment of asset A, potentially choose from among any of several other data streams carrying audio data for that same temporal segment, and potentially choose from among any of several other data streams carrying other types of data for that same temporal segment of asset A.

Figure 8:
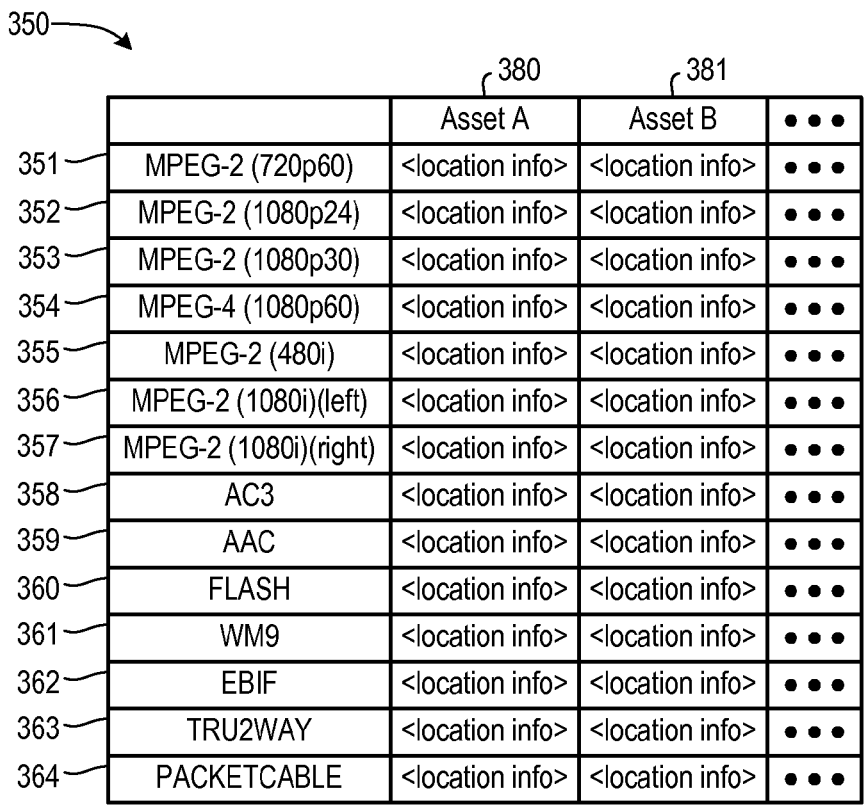
FIG. 8 shows another metadata table according to some embodiments.

FIG. 8 shows a table 350 that maps metadata regarding multicast data streams to information regarding locations of those streams. Each row of table 350 corresponds to metadata identifying a type of data. In the current example, the data types corresponding to the metadata of rows 351-364 are the same as those of rows 151-164 of table 106. Row 351, for instance, corresponds to metadata identifying a stream of data encoding an MPEG-2 720p60 representation of the asset A video content. Unlike table 106, however, each column of table 350 corresponds to metadata identifying a different asset. For purposes of the current example, table 350 includes a column for asset A and for another asset B, with ellipses indicating the presence of columns for additional assets.

Each cell of table 350 contains information that indicates where a user device can find a data stream of the type identified by a cell's corresponding row metadata and for the asset identified by a cell's corresponding column metadata. For convenience, FIG. 8 shows that information generically as "<location info>". That information could be an IP multicast address, an MPEG transport stream Packet IDentifier (PID), a frequency identifier, a time slot identifier, a code-division multiplexing code, or other type of information (or combination of information) that permits a user device to find packets of a particular data stream that are being simultaneously transmitted with other data streams. Some cells of table 350 may contain a null value or some other indicator that a particular stream does not exist, as the multicast data for some assets may not include certain data types. For example, asset B may not include video data encoded using a MPEG-4 CODEC (row 354), or may not include audio data encoded with an AAC CODEC (row 319), and/or may not include any enhancement layer data (rows 362-364).

In some embodiments, a copy of table 350 is stored in the memory of a user device or is otherwise readily accessible by the user device (e.g., through a URL or URI stored on the user device). In response to a user input selecting a particular asset, the user device uses table 350, together with data regarding the user device's capabilities, preference settings and/or permissions, to locate the appropriate data streams for the selected asset.

Figure 9:
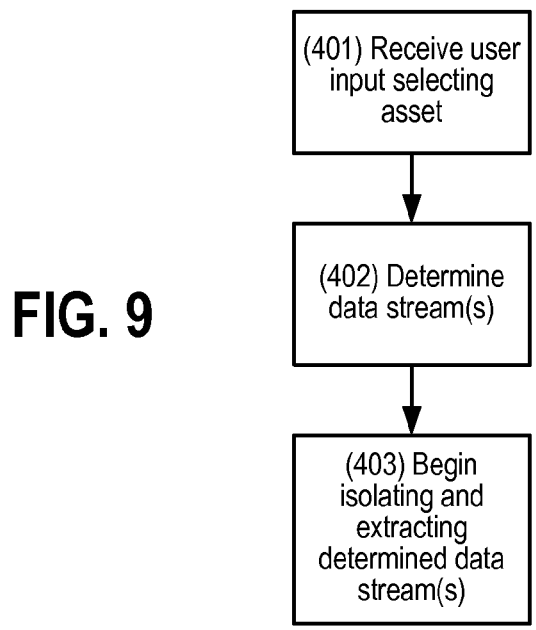
FIG. 9 is a block diagram showing steps performed by a user device according to some embodiments.

FIG. 9 is a block diagram showing steps performed by user device 16 (FIG. 2) in connection with multicast asset data. Similar operations can be performed by user devices 17-19 and by other user devices. In block 401, device 16 receives a user input (e.g., from remote control 56) selecting a particular multicast asset. This input could result from the user highlighting a particular region of an EPG or other user interface displayed on television 57 and pressing a button indicating selection. In other types of user devices, the input could take other forms (e.g., selecting an icon on a computer screen using a mouse).

In response to this selection, and as shown in block 402, device 16 determines the appropriate data streams for the selected asset. In some embodiments, and as previously discussed in connection with FIG. 2, memory 53 may store information regarding the capabilities of device 16 (e.g., supported video and audio CODECs, supported enhancement layer data types, whether 3D is supported, etc.). That information may also include data regarding the capabilities of television 57 or some other display device, user preferences (e.g., choice of picture quality, sound quality, etc.) and/or permissions granted by a network operator (e.g., whether user device 16 is allowed to use certain types of data). Device 16 uses this capability, preference and/or permission information to identify the rows of table 350 associated with the appropriate data types and utilizes the user's asset selection to identify a column of table 350. Device 16 then uses the location data in the cells of those row/column intersections to locate data streams in the communication medium of the access sub-network connecting device 16 to network 10.

As a result, and as shown by block 403, device 16 begins isolating those data streams from other received data and processing those isolated data streams. Depending on the type of user device and network used in a particular embodiment, a user device may send a communication to a network element to subscribe to the relevant data streams. For example, some or all of the asset data streams may be IP multicast streams. In such an embodiment, a user device may send an upstream request to join the multicast groups associated with each of the relevant data streams.

Unlike some unicast embodiments previously described, transmission of data streams for a selected multicast asset may have already been in progress at the time a user selects the multicast asset. In such a circumstance, the user device will simply begin isolating and processing the selected asset data streams from the point in the asset runtime matching the temporal segment being transmitted at or near the time the asset was selected.

Figure 10:
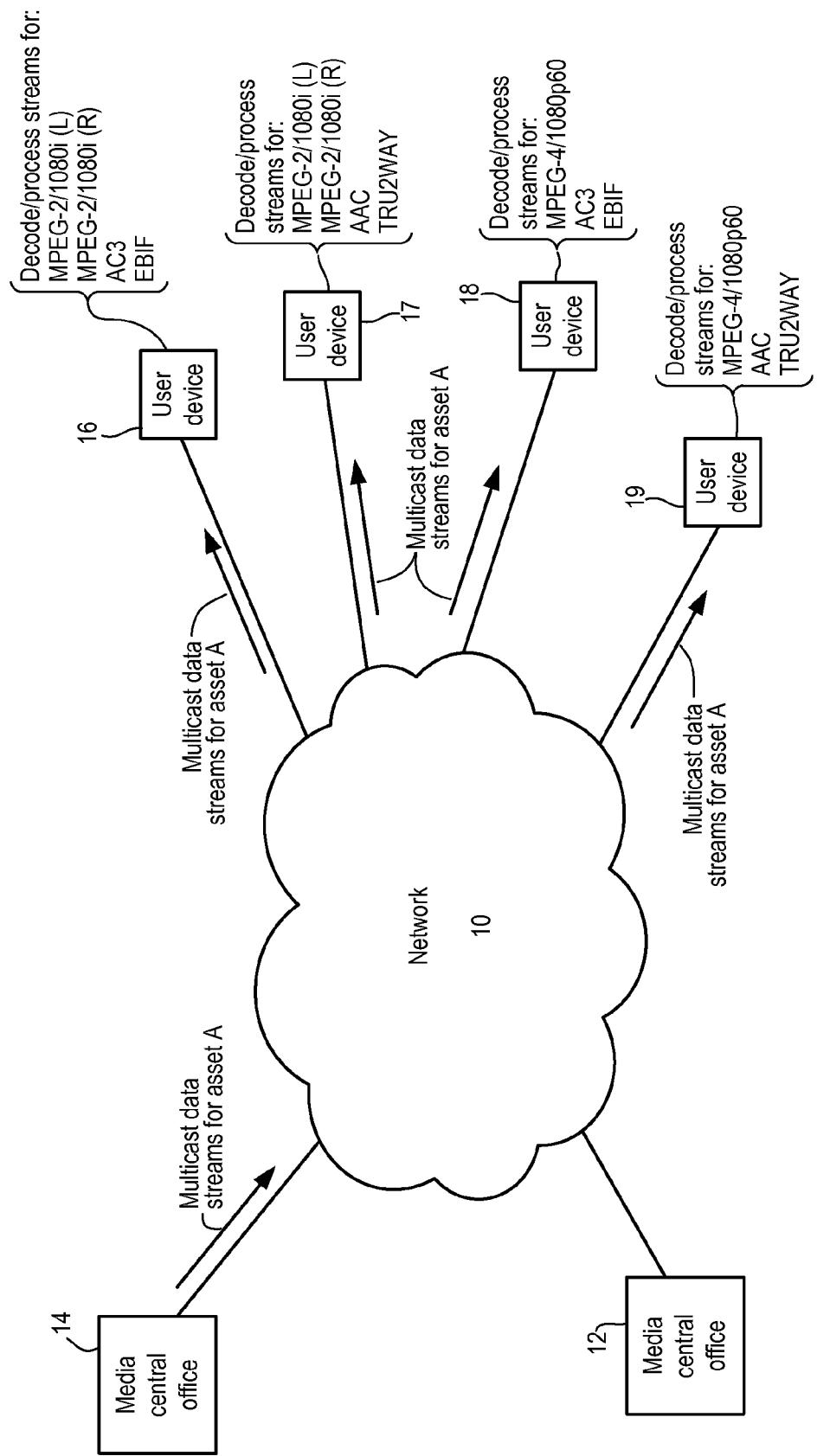
FIG. 10 is a block diagram similar to FIG. 1, but showing operation of at least one multicast embodiment.

FIG. 10 is a block diagram similar to FIG. 1, but showing details of operations performed by user devices 16-19 in connection with multicast transmission according to some embodiments. In the example of FIG. 10, media central office 14 is transmitting each of the data sets of asset A (FIG. 5) as a separate data stream on a multicast basis. Although not pertinent to the current example, central office 14 might be simultaneously transmitting data sets for asset B (FIG. 8) and other assets on a multicast basis.

The asset A multicast data streams are received by each of user devices 16-19 (and by other user devices, not shown). At a certain time after the multicast of asset A has begun, a user of device 16 selects asset A. In the example of FIG. 10, television 57 (FIG. 2) is able to reproduce 3D video representations. Also in the FIG. 10 example, device 16 utilizes an MPEG-2 video CODEC and can process data for a 1080i representation, includes an AC3 audio CODEC, and can process EBIF data. In response to the user selection of asset A, device 16 consults a copy of table 350 and begins decoding or otherwise processing data in the streams identified by rows 356, 357, 358 and 362 of table 350. Device 16 ignores other asset A multicast data streams.

Continuing with the FIG. 10 example, user device 17 is also connected to (or includes) a device that can reproduce 3D video representation. User device 17 utilizes an MPEG-2 video CODEC and can process data for a 1080i representation, includes an AAC audio CODEC, and can process TRU2WAY data. In response to a user selection of asset A, device 17 consults a copy of table 350 and begins decoding or otherwise processing data in the streams identified by rows 356, 357, 359 and 363 of table 350. Device 17 ignores other asset A multicast data streams.

User device 18 is not connected to a device that is able to render 3D representations of video content. However, user device 18 utilizes an MPEG-4 video CODEC and can process data for a 1080p60 representation, includes an AC3 audio CODEC, and can process EBIF data. In response to a user selection of asset A, device 18 consults a copy of table 350 and begins decoding or otherwise processing data in the streams identified by rows 354, 358 and 362 of table 350. Device 18 ignores other asset A multicast data streams.

Also in the FIG. 10 example, device 19 is not connected to a device that is able to render 3D representations of video content. Device 19 utilizes an MPEG-4 video CODEC and can process data for a 1080p60 representation, includes an AAC audio CODEC, and can process TRU2WAY data. In response to a user selection of asset A, device 19 consults a copy of table 350 and begins decoding or otherwise processing data in the streams identified by rows 354, 359 and 363 of table 350. Device 19 ignores other asset A multicast data streams.

Figure 11A:
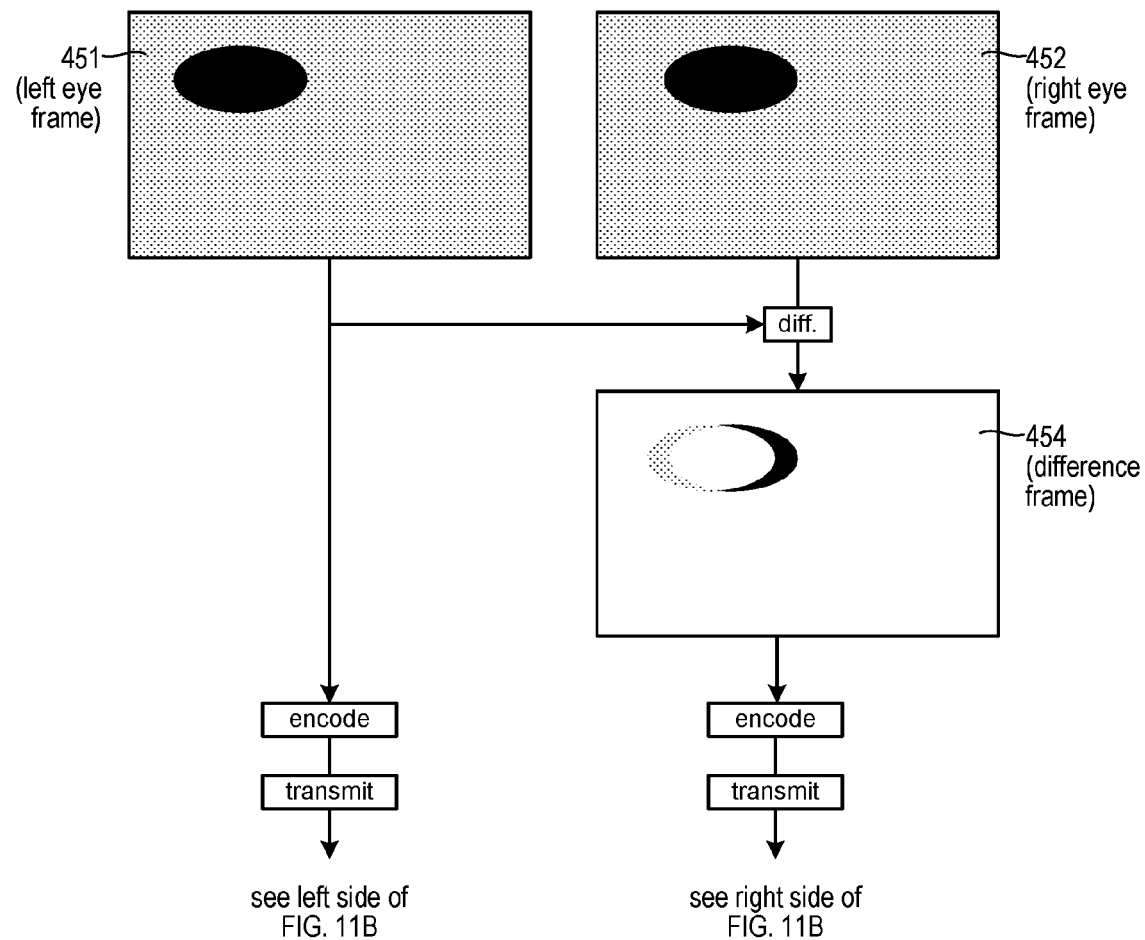
FIGS. 11A and 11B are a diagram illustrating additional compression of a right eye frame according to some embodiments.

Returning to table 106 of FIG. 4, and as shown by rows 156 and 157, data for asset A includes data encoding left eye and right representations of the video content. In some embodiments, the right eye representation data is further compressed relative to the left eye representation data. For example, FIG. 11A shows a frame 451 of an asset's video content that will be encoded for the left eye representation and frame 452 that will be encoded for the corresponding right eye representation. Frames 451 and 452 depict the same visual imagery from slightly different perspectives. In many cases, this means that most pixels in frame 451 will be the same as the pixels in the same positions in frame 452, and only certain pixel regions (e.g., associated with edges of regions having a constant color and intensity) will vary.

This is illustrated in FIG. 11A as frame 454, a frame showing the difference between frames 451 and 452. In frame 454, all pixels of frame 452 having a value equal to the value of the pixel at the same position frame 451 have been set to null. Null pixels are represented in frame 454 as white space. In some embodiments, only this difference frame is subjected to further encoding (e.g., MPEG-2 or H.264 compression) to create the right eye data. Left eye frames are encoded normally to create the left eye data.

Figure 11B:
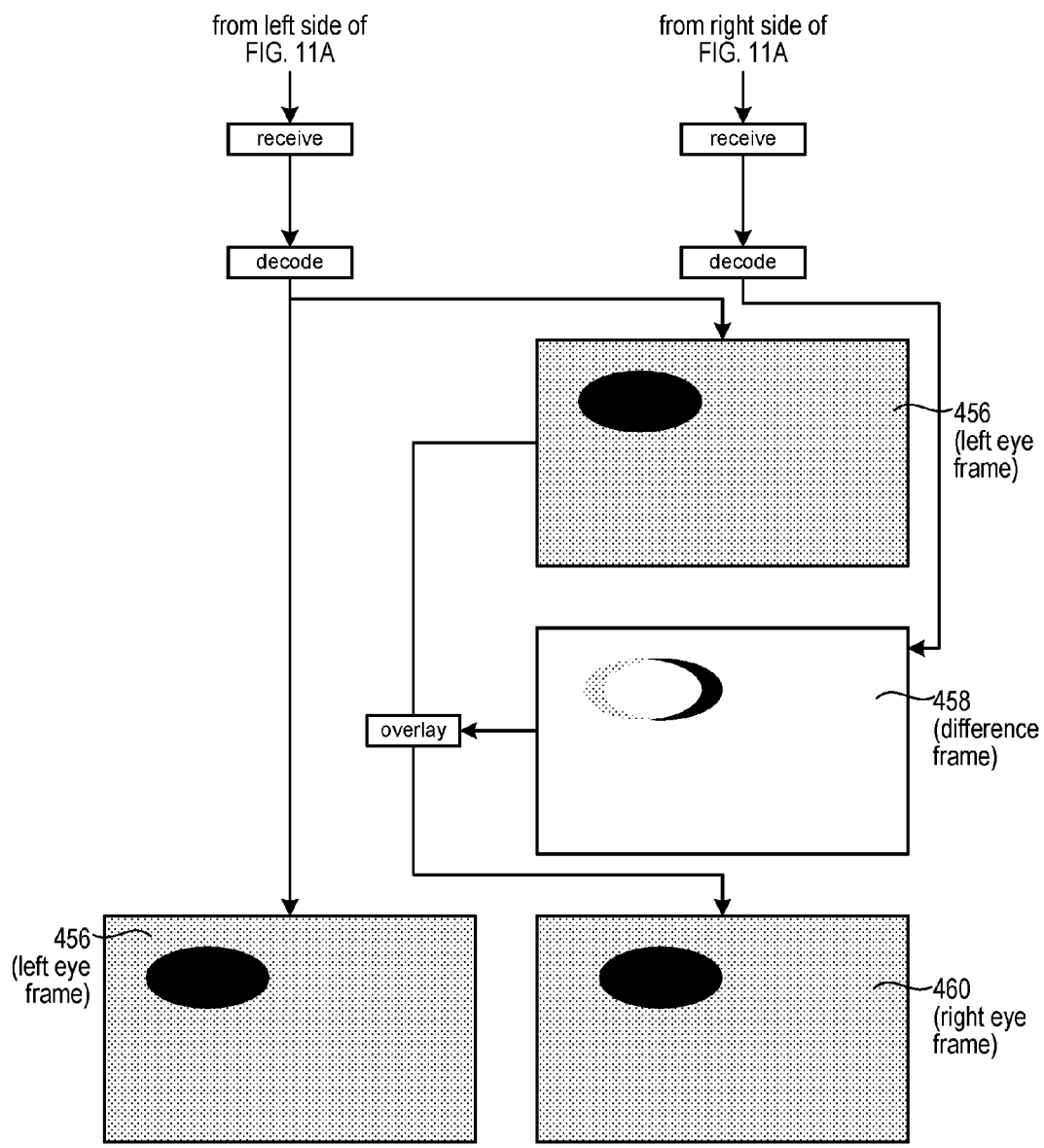

A data stream for the left eye representation may then contain data that conventionally encodes the left eye representation using a particular CODEC. The data stream for the right eye representation contains data that encodes the difference between the left eye and right eye frames. Both encoded streams are then transmitted (or stored and transmitted). Upon receipt of that data at a user device rendering the 3D representation, and as shown in FIG. 11B, the left eye data is decoded to create the left eye representation frame 456. To create the right eye representation, the right eye data is decoded to recreate the difference frame 458. The difference frame 458 is then combined with the corresponding left eye frame 456 to recreate the right eye frame 460.

The process of FIGS. 11A and 11B shows transmission of the right eye frame data as a stream encoding difference data, and transmitting the left eye frame as data encoding the entire left frame. The reverse process can be performed in other embodiments. For example, data for the left eye frame can be transmitted as data encoding a difference between a left eye frame and a right eye frame, and the entire right eye frame can be encoded and transmitted.

Although table 106 of FIG. 4 only shows a single 3D representation based on a particular CODEC (MPEG-2) and having a particular video quality (1080i), 3D representations based on other CODECs and having other video qualities could also be included. For a given CODEC and a particular video quality, only the left eye representation data stream need be provided to user devices unable to render 3D video content. Both the left and right representation data streams can be provided to devices that render 3D content.

In at least some embodiments, sets of grid encoded data for an asset can be created by first obtaining data for a base video representation and a base audio representation of the asset content. In the event there are multiple versions of the video or audio content, data for base representations for all versions may be obtained. The base representation data may then be transcoded into data for all other desired representations. Enhancement layer data can then be added through an iTV striping process. The video, audio and enhancement data sets can then be fragmented into appropriately sized temporal segments. As indicated above, each temporal segment need not be the same size. Each fragment may then be assigned an identifier and mapped to metadata for data type and temporal segment using an asset metadata table. If additional representations and/or versions of the asset data need to be added at a future time, this can easily be performed by extending the metadata table to map the fragments for any added data. This extension of the metadata table need not affect pre-existing metadata or previously stored asset data, thereby not affecting the ability of existing user devices to access the pre-existing data.

As described above, metadata identifying asset data types and temporal segments is used to access desired media asset data. In some embodiments, this metadata can be contained in an EPG or other user interface presented by a user device. When a user selects a particular type of content using such an EPG, the appropriate metadata can be copied from the EPG into a request transmitted by the user device. In the case of multicast data, a message bus can be utilized. Appendix A attached hereto includes sample JAVA Message System (JMS) extensible markup language (XML) code for subscription to a message bus.

In some embodiments, and as indicated above in connection with table 350 of FIG. 8, tables similar to table 106 (FIG. 4) can be used in connection with multicast transmission of asset data in a network. In some other embodiments, data streams of interest may be filtered and sent to user devices on a unicast basis.

These and other embodiments offer multiple advantages. Various embodiments allow a network operator to decouple data coding decisions from user device capabilities. In particular, the ability of a network operator to implement new codings is not limited by the lowest common denominator in a system-wide population of user devices. If all types of data for a particular video asset are transmitted as a blob to all user devices, for example, legacy devices that do not recognize certain newer types of data could malfunction. Under such circumstances, a network operator could face the choice of either foregoing implementation of newer data types or upgrading (or modifying) numerous user devices in the field. Using embodiments described herein, however, a network operator is instead able to implement new data encodings and other innovations without needing to simultaneously upgrade all deployed user devices.

By transmitting data types based on user device capabilities, user preferences and/or business rules, unneeded data types need not be transmitted. This can allow more efficient usage of network resources. As newer data encodings and service offerings are developed, such efficiencies can become increasingly important.

Figure 12:
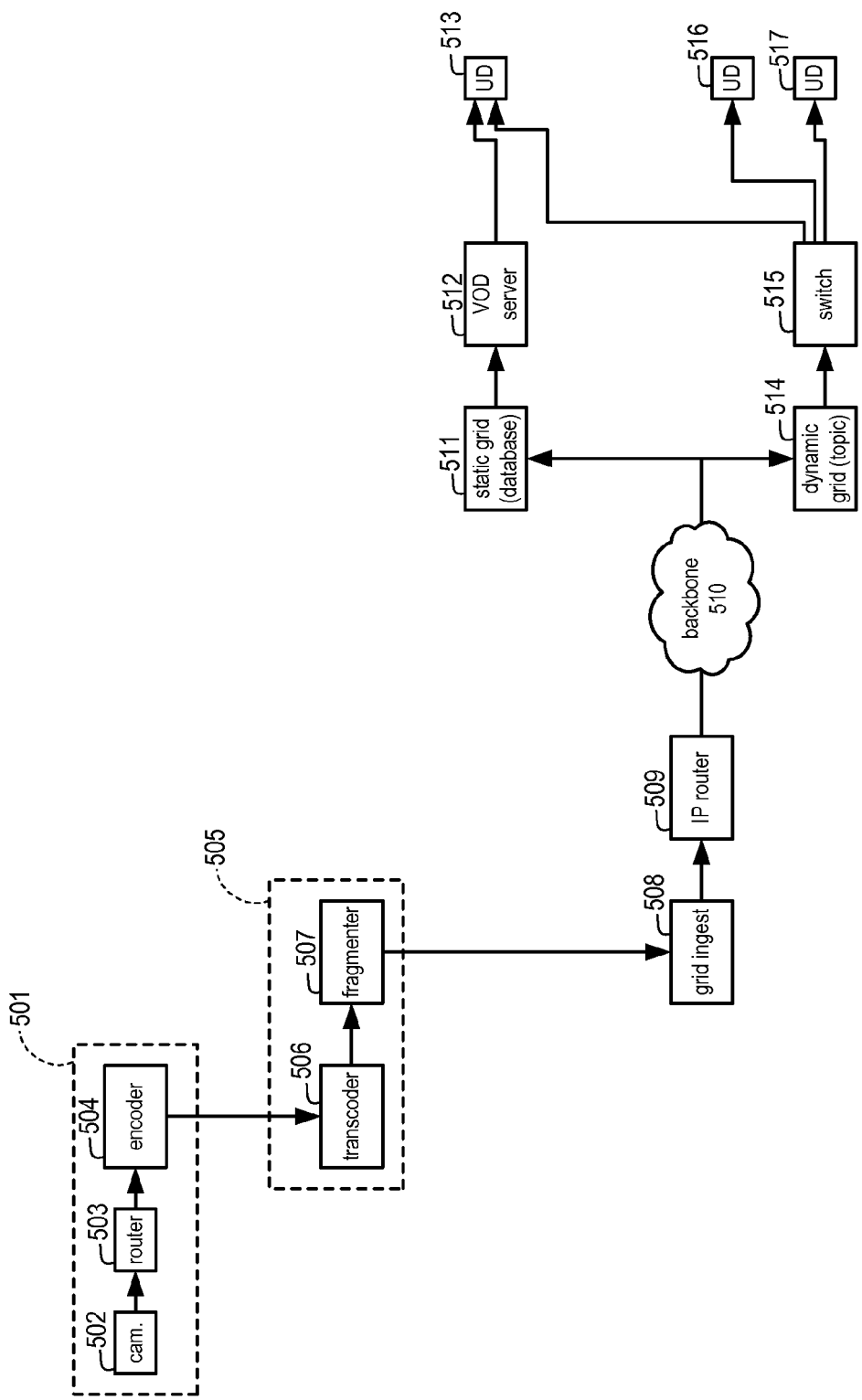
FIG. 12 is a diagram showing generation and distribution of video asset data according to some embodiments.

FIG. 12 is a diagram showing generation and distribution of video asset data according to some embodiments. In initial encoding operations of block 501, data for an asset is initially generated and stored in a base encoding. For example, such data could come directly from a camera 502 or other recording device. As another example (not shown), video, audio and/or other types of asset data that has previously been generated may be provided over a network connection or by other means. Data from camera 502 and/or other sources is provided via one or more routers 503 to an encoder 504. Encoder 504, which may be one or more computers executing encoding software, generates a base version of asset video and/or audio data. That base version may be a high resolution representation that contains a relatively large amount of data, but which can be transcoded into other representations having differing tradeoffs between data quantity and renderable image (and/or sound) quality. Encoder 504 may also add (or stripe) enhancement layer data of various types, with such enhancement layer data being received from the same or different sources providing video and audio feeds.

The base version of an asset's data is then forwarded to one or more additional computers in an adaptive streaming block 505. In the example shown, a first computer 506 transcodes asset data into multiple different versions. A second computer 507 then fragments those different versions of the asset data (e.g., along GOP boundaries).

Fragmented asset data is then forwarded to one or more computers or other devices 508 for ingest into one or more grids, such as have been previously described. Devices 508 could include databases, content distribution networks and/or other systems for persisting the asset data fragments. If not previously added (e.g., by device 504 or by other devices not shown in FIG. 12), enhancement layer data can be added concurrently with ingest of video and audio data into device 508. From devices 508, asset data is forwarded via one or more IP routers 509 and a network backbone 510 for both unicast/VOD and multicast/linear distribution. For example, asset data can be forwarded to one or more static grid databases 511 for distribution via one or more VOD servers 512 to a user device 513 (e.g., an STT). As another example, asset data can be published into a dynamic topic grid 514. Different parts of that asset data (e.g., differently encoded representations) can then be linearly distributed, via one or more switches 515, to multiple user devices (e.g., devices 513, 516 and 517) subscribing to streams containing specific types of data for the asset. Such publication of and subscription to different asset data types can utilize a JMS message queue or other type of topic queue. This would permit, e.g., an STT user device 513 to subscribe to and receive a linear stream containing a first collection of asset data types (e.g., MPEG-2 encoded video, AC3 encoded audio, EBIF enhancement data), a personal computer user device 516 to subscribe to and receive a linear stream containing a second collection of asset data types (e.g., AVC encoded video and AAC encoded audio), a mobile user device 517 to subscribe to and receive a linear stream containing a third collection of asset data types (e.g., ATSC-MH encoded video and AACv2 encoded audio), etc. Other user devices could subscribe to and receive linear streams of other combinations of video, audio and enhancement data for a particular asset.

In some embodiments, existing session resource manager (SRM) devices and/or software can be utilized to implement use of grid encoded media asset data. In particular, user device requests for asset data can be routed through an SRM. Based on business rules (e.g., whether a user device is associated with a customer entitled to receive a particular service), data regarding individual device capabilities, and other parameters, the SRM then formulates a request for the specific types of asset data to be used by the user device. In other embodiments, a user device can formulate a request for specific asset data types, which request is then processed by an abstraction software layer (in a VOD server or other device) to assemble the appropriate data types in response to the request. Thus, for example, a set top terminal user device could make a request for asset data and receive MPEG-2 encoded video, AC-3 encoded audio and eBIF data, while a personal computer user device could request different types of data for that same asset and receive, e.g., AVC encoded video and AAC encoded audio.

Embodiments also include one or more machine-readable storage media (e.g., a CD-ROM, CD-RW, DVD, floppy disc, FLASH memory, RAM, ROM, magnetic platters of a hard drive, etc.) that store instructions executable by one or more processors to carry out one or more of the operations described herein. As used herein (including the claims), a machine-readable storage medium is a physical structure that can be touched by a human. A signal would not by itself constitute a machine-readable storage medium.

Some embodiments propose multicasting deep into a network and populating a grid with fragmented video, audio, and associated data. A user device could then query the grid in order to retrieve fragments that the user device is capable of utilizing for, e.g., multimedia playback.

Some embodiments could multicast deep into a network and populate a queue or topic with fragmented multimedia cells. User devices could subscribe to the appropriate queue or topic in order to retrieve the correct fragments to produce a multimedia experience on the device.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. All embodiments need not necessarily achieve all objects or advantages identified above. Any and all permutations of various features described herein are within the scope of the invention. The features of the embodiments described herein may be combined in all possible combinations of methods, apparatus, modules, systems, and computer program products. Any and all permutations of features described herein are within the scope of the invention.

---

APPENDIX A

---

Sample Message Bean XML
```
<?xml version="1.0" encoding="ISO-8859-1"?>
<tv-ejb-jar xmlns="http://www.objectweb.org/tv/ns"
            xmlns:xsi="http://www.w3.org/2001/XMLSchema-instance"
            xsi:schemaLocation="http://www.objectweb.org/tv/ns
            http://www.objectweb.org/tv/ns/tv-ejb-jar_4_0.xsd" >
    <tv-entity>
        <ejb-name>VersusChannel</ejb-name>
        <jndi-name>VersusChannelHome</jndi-name>
        <jndi-local-name>ExampleTwoLocalHome</jndi-local-name>
        <jdbc-mapping>
            <jndi-name>jdbc_1</jndi-name>
            <jdbc-table-name>MoviesTable</jdbc-table-name>
            <cmp-field-jdbc-mapping>
                <field-name>MovieTitle</field-name>
                <jdbc-field-name>dbMovieTitle</jdbc-field-name>
            </cmp-field-jdbc-mapping>
            <cmp-field-jdbc-mapping>
                <field-name>VideoCODEC</field-name>
                <jdbc-field-name>dbVideoCODEC</jdbc-field-name>
            </cmp-field-jdbc-mapping>
            <cmp-field-jdbc-mapping>
                <field-name>AudioCODEC</field-name>
                <jdbc-field-name>dbAudioCODEC</jdbc-field-name>
            </cmp-field-jdbc-mapping>
            <finder-method-jdbc-mapping>
                <tv-method>
                    <method-name>findByMovieTitle</method-name>
                </tv-method>
                <jdbc-where-clause>where dbMovieTitle = 'Avatar'</jdbc-where-clause>
            </finder-method-jdbc-mapping>
        </jdbc-mapping>
    </tv-entity>
</tv-ejb-jar>
```

The invention claimed is:

1. A method, comprising:

receiving, by a computing device, a selection of a media asset;

responsive to the selection of the media asset, determining, by the computing device, at least one video encoding type, a video quality, and an audio encoding type of the media asset to request based on a video representation type preference and an audio representation type preference;

determining, by the computing device from a listing of available multicast streams, at least one internet protocol (IP) video multicast address of at least one video multicast stream based on the at least one video encoding type, the video quality, and an identifier of the media asset;

determining, by the computing device from the listing, an IP audio multicast address of an audio multicast stream based on the audio encoding type and the identifier of the media asset;

transmitting, by the computing device, at least one IP video multicast join request for the at least one video multicast stream and an IP audio multicast join request for the audio multicast stream, the at least one IP video multicast join request comprising the at least one IP video multicast address of the at least one video multicast stream and the IP audio multicast join request comprising the IP audio multicast address of the audio multicast stream;

receiving, based on the at least one IP video multicast join request, the at least one video multicast stream; and receiving, based on the IP audio multicast join request, the audio multicast stream.

2. The method of claim 1, further comprising:

accessing, by the computing device, the listing of available multicast streams, wherein each multicast stream corresponds to a representation type different from other representation types of other multicast streams, wherein the listing comprises separate entries for at least one video stream and at least one audio stream.

3. A method, comprising:

receiving, from a first computing device by a second computing device, a request for a media asset;

responsive to the request, determining, by the second computing device, at least one video encoding type, a video quality, and an audio encoding type of the media asset to transmit based on a video representation type preference and an audio representation type preference associated with the first computing device;

determining, by the second computing device from a listing of available multicast streams, at least one identifier of at least one video data set based on the at least one video encoding type, the video quality, and an identifier of the media asset;

determining, by the second computing device from the listing, an identifier of an audio data set;

adding the first computing device to at least one video multicast group associated with the at least one video data set based on the at least one identifier of the at least one video data set and to an audio multicast group associated with the audio data set based on the identifier of the audio data set; and transmitting at least one video multicast stream of the media asset associated with the at least one video multicast group to the at least one video multicast group comprising the first computing device and an audio multicast stream of the media asset associated with the audio multicast group to the audio multicast group comprising the first computing device.

4. The method of claim 2, further comprising:

receiving a listing of available multicast streams of a second media asset;

receiving a selection of the second media asset; and accessing, responsive to the selection of the second media asset, the listing of available multicast streams of the second media asset, each multicast stream of the second media asset corresponding to a unique video encoding type or a unique audio encoding type in the listing.

5. The method of claim 1, wherein the video representation type preference comprises a three dimensional representation type preference, and wherein transmitting the at least one IP video multicast join request for the at least one video multicast stream comprises:

transmitting a first IP video multicast join request for a first multicast stream corresponding to a first visual perspective of video frames of the media asset and a second IP video multicast join request for a second multicast stream corresponding to a second visual perspective of the video frames of the media asset.

6. The method of claim 1, wherein determining the at least one IP video multicast address of the at least one video multicast stream comprises:

determining a first IP video multicast address of a first multicast stream corresponding to a first visual perspective of the media asset at a first resolution and a second IP video multicast address of a second multicast stream corresponding to a second visual perspective of the media asset at the first resolution based on a three dimensional representation type preference and a resolution preference, and wherein transmitting the at least one IP video multicast join request for the at least one video multicast stream comprises:

transmitting a first IP video multicast join request for the first multicast stream at the first resolution based on the first IP video multicast address and a second IP video multicast join request for the second multicast stream at the first resolution based on the second IP video multicast address.

7. The method of claim 5, wherein receiving the at least one video multicast stream comprises:

receiving, based on the first IP video multicast join request and in the first multicast stream, a first sequence of frames corresponding to the first visual perspective of the video frames of the media asset; and receiving, based on the second IP video multicast join request and in the second multicast stream, a second sequence of frames encoding differences between the first visual perspective of the video frames of the media asset and the second visual perspective of the video frames of the media asset.

8. The method of claim 2, wherein accessing the listing of available multicast streams comprises:

accessing, responsive to the selection, a listing of available video, audio, or enhancement layer multicast streams of the media asset with each multicast stream corresponding to an encoding type of the media asset different from other encoding types of other multicast streams of the media asset.

9. The method of claim 1, wherein determining the at least one IP video multicast address of the at least one video multicast stream comprises:

determining the at least one video multicast stream from the listing based on the video representation type preference comprising at least one of display device capabilities, user preferences, and network operator permissions.

10. The method of claim 8, wherein accessing the listing of available multicast streams comprises:
accessing the listing of available video, audio, or enhancement layer multicast streams of the media asset comprising location information of the available video, audio, or enhancement layer multicast streams.

11. The method of claim 3, wherein each multicast stream in the listing corresponds to a representation type of the media asset different from other representation types of other multicast streams, and wherein the listing comprises separate entries for at least one video stream and at least one audio stream.

12. The method of claim 3, wherein receiving the request for the media asset comprises:
receiving a request for a first multicast stream corresponding to a first visual perspective of video frames of the media asset and a second multicast stream corresponding to a second visual perspective of the video frames of the media asset.

13. The method of claim 12, wherein transmitting the at least one video multicast stream comprises:
transmitting, to a first video multicast group comprising the first computing device and in the first multicast stream, a first sequence of frames corresponding to the first visual perspective of the video frames of the media asset; and
transmitting, to a second video multicast group comprising the first computing device and in the second multicast stream, a second sequence of frames encoding differences between the first visual perspective of the video frames of the media asset and the second visual perspective of the video frames of the media asset.

14. The method of claim 11, wherein the listing comprises a listing of available video, audio, and enhancement layer multicast streams of the media asset with location information of the available video, audio, and enhancement layer streams.

15. A method, comprising:
receiving, from a first computing device by a second computing device, a request for a video program in a three dimensional representation;
responsive to the request, determining, by the second computing device from a listing of available data sets of the video program based on at least one video encoding type, a video quality, and an audio encoding type, identifiers for each of two different video data sets comprising video fragments of the video program corresponding to the three dimensional representation and an identifier of an audio data set comprising audio fragments of the video program, wherein a first video data set of the two different video data sets corresponds to a first visual perspective of the video program and a second video data set of the two different video data sets corresponds to a second visual perspective of the video program;
determining, by the second computing device, a storage location of the video fragments and the audio fragments based on the identifiers for each of the two different video data sets and the identifier of the audio data set; and
transmitting a first stream comprising the first video data set, a second stream comprising the second video data set, and a third stream comprising the audio data set.

16. The method of claim 15, further comprising:
adding the first computing device to a first multicast group associated with the first stream, to a second multicast group associated with the second stream, and to a third multicast group associated with the third stream.

17. The method of claim 15, wherein the second video data set differences between video frames of the video program from the first visual perspective and video frames of the video program from the second visual perspective.

18. The method of claim 15, wherein receiving the request comprises:
receiving, from the first computing device, the request for the video program in the three dimensional representation in a first video resolution,
wherein the available data sets of the listing correspond to a plurality of video resolutions and wherein the determining the identifiers for each of the two different video data sets is further based on the first video resolution.

19. The method of claim 15, wherein each of the identifiers for each of the two different video data sets comprises a storage address of a respective available data set of the video program, and
wherein determining the storage location comprises:
determining the storage location of the video fragments and the audio fragments based on storage addresses associated with the video data sets and the audio data set in the listing.

20. The method of claim 15, wherein the request for the video program comprises timing information, the method further comprising:
determining, by the second computing device, a subset of the video fragments of the two different video data sets and a subset of the audio fragments of the audio data set to transmit to the first computing device based on the timing information.

* * * * *

UNITED STATES PATENT AND TRADEMARK OFFICE
CERTIFICATE OF CORRECTION

PATENT NO. : 9,271,052 B2
APPLICATION NO. : 13/103185
DATED : February 23, 2016
INVENTOR(S) : Dan Holden Page 1 of 1

It is certified that error appears in the above-identified patent and that said Letters Patent is hereby corrected as shown below:

In the Claims

Column 22, Claim 17, Line 22:
Before "differences", please insert --encodes--

Signed and Sealed this
Nineteenth Day of February, 2019

Andrei Iancu
*Director of the United States Patent and Trademark Office*